BIPOLAR BINARY DIGITAL DATA VESTIGIAL SIDEBAND SYSTEM

Filed June 16, 1961 2 Sheets-Sheet 1

INVENTORS F. K. BECKER
J. R. DAVEY
BY J. P. Kearns Jr.
ATTORNEY

BIPOLAR BINARY DIGITAL DATA VESTIGIAL SIDEBAND SYSTEM

Filed June 16, 1961 2 Sheets-Sheet 2

INVENTORS F. K. BECKER
J. R. DAVEY
BY
J. P. Kearns, Jr.
ATTORNEY

United States Patent Office 3,152,305
Patented Oct. 6, 1964

3,152,305

BIPOLAR BINARY DIGITAL DATA VESTIGIAL SIDEBAND SYSTEM

Floyd K. Becker, Colt's Neck, and James R. Davey, Franklin Township, Somerset County, N.J., assignors to Bell Telephone Laboratories, Incorporated, New York, N.Y., a corporation of New York Filed June 16, 1961, Ser. No. 117,747
8 Claims. (Cl. 325—50)

This invention relates to vestigial sideband signal transmission systems and particularly to such a system for handling digital data signals on voice-frequency lines of telephone grade. Provision is made for transmitting the carrier frequency in a way which simplifies the recovery of the data signal in a synchronous detection receiver system.

It is an object of this invention to provide a serial binary data transmission system that is efficient in bandwidth and possessed of a good signal-to-noise capability.

It is a further object of this invention to furnish an intelligence signal in which carrier information is included in such a way as to simplify the control of a locked oscillator, synchronous detection system at the receiver end of a data transmission system.

It is another object of this invention to maintain a discrete separation between the transmitted carrier wave and its associated sideband components even when the intelligence signal includes components extending to zero frequency.

It is still another object of this invention to make it practical to transmit bipolar binary digital data by means of a vestigial sideband transmitted signal over a communication channel.

It is a still further object of this invention to reconstruct from a vestigial sideband intelligence signal all frequency components existing in the original intelligence without the necessity of actually transmitting all such components.

Where restricted sideband techniques have been attempted for high-speed transmission of data, envelope detection methods have been used at the receiver. The use of envelope detection, however, has several disadvantages. One of these is that a carrier component large in comparison with the sideband component must be transmitted in order to avoid excessive waveform distortion. The consequent low modulation index results in low tolerance to noise and signal level variation. Transmitter power which might otherwise be used in the intelligence-bearing sideband is wasted in transmitting the carrier.

Synchronous detection, however, eliminates the waveform distortion and permits a reduction in the amount of carrier component transmitted. More of the available transmitter power can go into the side band and a greater tolerance to noise and to signal level variation can be achieved. The requirement for a high-level carrier is transferred from the transmitter to the receiver, however. The local carrier at the receiver must, therefore, be generated in proper phase relation to the restricted sideband signal. This carrier can be derived from, or controlled by, a partially suppressed transmitted carrier only by placing severe restrictions on the data coding. Synchronous detection has generally been avoided in data transmission systems because of the difficulty of obtaining a properly phased demodulating carrier at the receiver.

Restricted sideband transmission, such as single sideband and vestigial sideband, has long been used in telephone and television carrier systems to conserve bandwidth. This invention combines the bandwidth conserving properties of vestigial sideband transmission with the distortion reducing properties of synchronous detection for data transmission systems.

According to this invention bipolar data signals are modulated onto a carrier wave as phase reversals of the carrier. Low frequency components of the data signal are first removed, however, by applying the baseband data signal to a high-pass filter with a low frequency cutoff in the region of 40 to 150 cycles per second. This is done to avoid interference with the transmitted carrier by providing a guard space in a vestigial sideband signal. Frequencies lying above the voice transmission band are also removed prior to modulation in a low-pass filter to avoid foldover of components above the maximum signaling rate. The filtered data signal is product modulated with the carrier wave from a stable oscillator to produce an amplitude-modulated, suppressed-carrier signal. The signal resulting from this modulation is combined in a hybrid circuit with a quadrature-phase carrier signal. One of the sidebands, preferably the upper, is restricted in a bandpass filter with the result that a vestigial sideband signal is produced. The carrier frequency is preferably located in the upper half of the voice band, thus allowing nearly the full voice band to carry signal information. Higher modualtion frequencies within a given available bandwith are allowable in a vestigial sideband signal than in the corresponding double-sideband signal. The quadrature carrier component absorbs but a small amount of transmitter power.

An important feature of the invention is that the quadrature reinserted carrier simplifies the receiver by requiring only one synchronous detector which serves the double function of demodulating the signal information and also directly providing a lock-up control for the local oscillator.

Another feature of the invention is that low-frequency signal components removed at the transmitter to provide guard space for the reinserted carrier wave are recovered at the receiver in a quantized feedback circuit.

A further feature of the invention is that the strong second harmonic of the transmitted carrier available at the output of the single synchronous detector is used as an automatic gain control signal.

An important advantage of the use of vestigial sideband transmission and synchronous detection is that data rates up to 3000 bits per second are made possible.

Further objects, features and advantages of the invention will become apparent upon consideration of the following detailed description and the drawing in which.

There are several methods for generating a vertigial sideband signal, which includes one full sideband and a mere vestige of the remaining sideband. Such a signal is ordinarily used in transmitting intelligence having frequency components down to zero frequency or direct current, such as, the television video signal, where there is also a requirement to conserve bandwidth. One common method for generating a vestigial sideband signal is to first generate a full double-sideband signal and then remove the undesired sideband in a filter having the appropriate bandpass characteristics with the carrier frequency located at the edge of the filter's transmission band.

Figure 1:
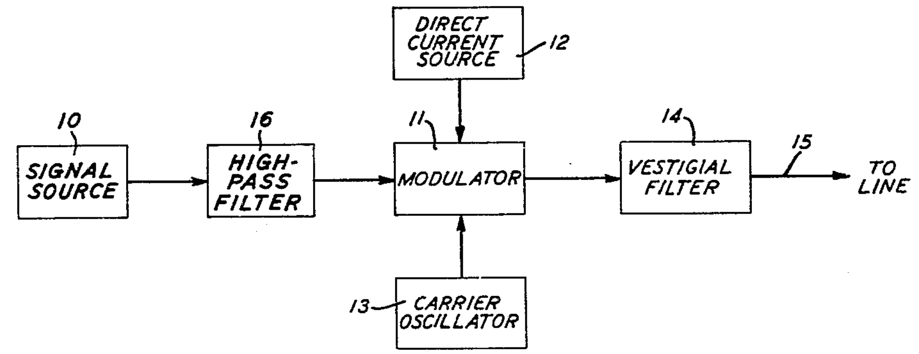
FIG. 1 is a block diagram of an exemplary system for generating a vestigial sideband signal which includes a reduced in-phase carrier component.

Another method is illustrated in the system of FIG. 1 where modulator 11 is assumed to be a balanced modulator of the type which inherently balances out any carrier or signal components. Modulator 11 may be a varistor bridge modulator well known in the art. Modulator 11 is effectively a switching circuit controlled at the frequency of the output of carrier oscillator 13. The intelligence output from signal source 10, which may furnish a speech or a data signal, is modulated on the carrier frequency in modulator 11 to produce upper and lower sidebands. No carrier component would ordinarily result. However, with the addition of direct-current source 12 the varistor bridge in modulator 11 can be biased into sufficient unbalance to permit a desired amount of carrier to leak through. Full carrier is not present, however, so that most of the output energy still resides in the sidebands. Vestigial filter 14 then removes the unwanted sideband and delivers a vestigial sideband signal to transmission line 15. In order to prevent interference at the receiver by any signal components in the vicinity of the carrier, a high-pass filter 16 in series with the signal source removes very low frequency signal components and provides a guard space around the carrier in the transmitted signal.

In synchronous, or homodyne, detection the receiver local oscillator operates at exactly the same frequency as the carrier wave. Further it is necessary that the phase of the local oscillator be locked to that of the carrier if distoration is to be avoided. The problem in all suppressed carrier double sideband, single sideband and vestigial sideband systems is to provide this phase synchronization between transmitter and receiver.

Figure 2:
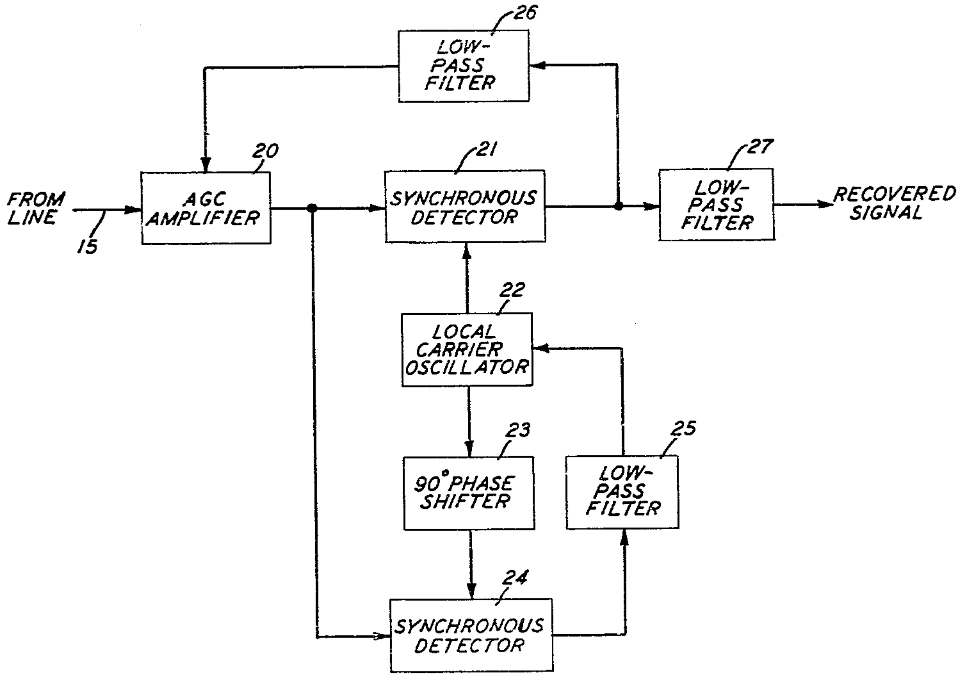
FIG. 2 is a block diagram of a receiver circuit for recovering the intelligence signal from the type of vestigial sideband signal produced by the transmitter of FIG. 1.

FIG. 2 shows a receiver which is adapted to demodulate the type of vestigial sideband transmitted signal produced in the transmitter of FIG. 1, using synchronous detection. The incoming signal from line 15 is applied to an automatic gain controlled amplifier 20 to compensate for variations in transmission conditions on the line and to present a constant carrier level signal to the receiver. The output of amplifier 20 is split between synchronous detectors 21 and 24. Synchronous detector 21 is required to recover the signal intelligence and synchronous detector 24 is required to recover an error signal from which the local oscillator can be locked to the transmitted carrier. Both detectors are switching type product modulators of any well-known type. Detector 21 has a further input from a local oscillator 22, which must be maintained at the frequency and phase of the transmitted carrier. The direct-current output of detector 21 is a measure of the phase difference between the incoming signal carrier and the output of the local oscillator.

Since the binary digits are encoded on the transmitted carrier as phase reversals, the local oscillator must be exactly in phase with the transmitted carrier. However, a phase-lock oscillation results in a quadrature relationship between the local oscillator output and the locking signal phase. Therefore, a portion of the output of local oscillator 22 is phase-shifted 90° in phase shifter 23 before being applied to synchronous detector 24. The output of synchronous detector 24 is then a signal having an average direct-current level of zero when the phases of the incoming carrier and the local oscillator are in phase. The level changes to positive or negative values when the local oscillator drops out of phase synchronism. This level change is applied through low-pass filter 25 to the local oscillator as an error signal to maintain a phase lock with the incoming carrier.

There is a direct-current component in the output of synchronous detector 21 due to the transmitted carrier. This is used as a control signal by way of low-pass filter 26 to amplifier 20. The latter amplifier may be a vario-losser type having non-linear impedance elements in series with the incoming signal. The impedance of these elements is controlled by the direct-current output of filter 26.

The output of detector 21 also contains the intelligence. After passing through low-pass filter 27 to remove any high frequency components, the intelligence signal is recovered in any conventional manner.

The disadvantage of the vestigial sideband system of FIGS. 1 and 2 is that two synchronous detectors are required at the receiver and that a direct-current component appears in the output of the synchronous detector due to the presence of the carrier. This latter component must be blocked from the final signal recovery circuit by a large capacitance and the low-frequency components restored by an appropriate direct-current restoration circuit.

According to this invention these disadvantages can be overcome by inserting the reduced level carrier in quadrature with the position it would otherwise occupy. This eliminates any direct-current component from the received signal, reduces the maximum amplitude of the transmitted signal, and provides for direct control of the receiver local oscillator from the output of a single synchronous detector without requiring a phase shifting network.

Figure 3:
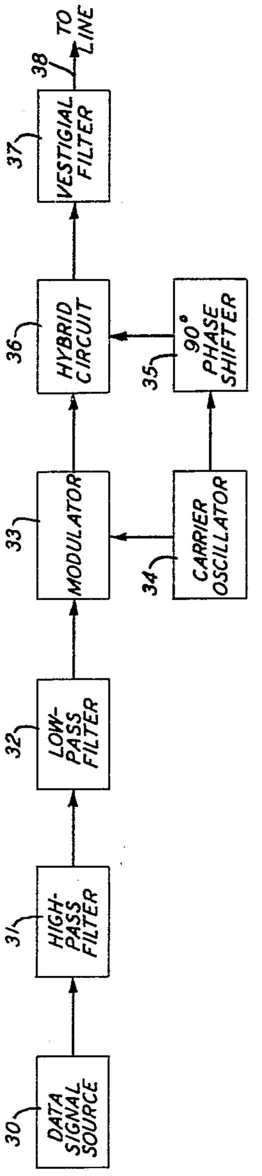
FIG. 3 is a block diagram of a preferred vestigial sideband transmitting circuit according to this invention.

FIG. 3 is a block diagram of the improved transmitter. Bipolar data is generated in signal source 30. Positive pulses may indicate spaces and negative pulses, marks—to use telegraph language. These pulses contain frequency components from zero frequency to well beyond the voice range. Lower frequency components below about 150 cycles, although this figure is not critical, are removed in high-pass filter 31 in order to create a hole in the region about the carrier when these pulses are modulated onto a carrier. A resistance-capacitance filter may be used to accomplish the desired roll-off in frequencies and a good impedance match. The data signal is further passed through a low-pass filter 32 to attenuate frequencies higher than the maximum fundamental signaling rate and thus avoid foldover components upon modulation. It is apparent that filters 31 and 32 may be combined into a single bandpass filter.

The filtered data signal is applied to one input of a product modulator 33 which has its other input connected to the output of carrier oscillator 34. The modulator is arranged so that reversals in the polarity of the data signal result in reversals of the phase of the carrier wave. The result is that carrier bursts in-phase with the carrier oscillator output represent spaces and those out-of-phase represent marks, for example. The resultant output is a double-sideband suppressed carrier signal. Because of high-pass filter 31 there is a guard space about the carrier up to 300 cycles wide. Into this guard space is introduced by way of hybrid circuit 36 a reduced level carrier wave portion from carrier oscillator 34 shifted in phase by 90° in phase shifter 35. Since this carrier portion is in quadrature, little increase in level of the transmitted signal results. Hybrid circuit 36 is a conventional type, a two-winding balanced transformer, for example, and prevents carrier leak back into modulator 33. One of the sidebands is removed in vestigial filter 37 to form the actual vestigial sideband signal applied to line 38. The carrier frequency may in a practical case be established at 2100 cycles and the sideband suppressed may be the upper one. This places the transmitted signal conveniently in the center of the telephone voice frequency band where delay distortion is least troublesome.

Figure 4:
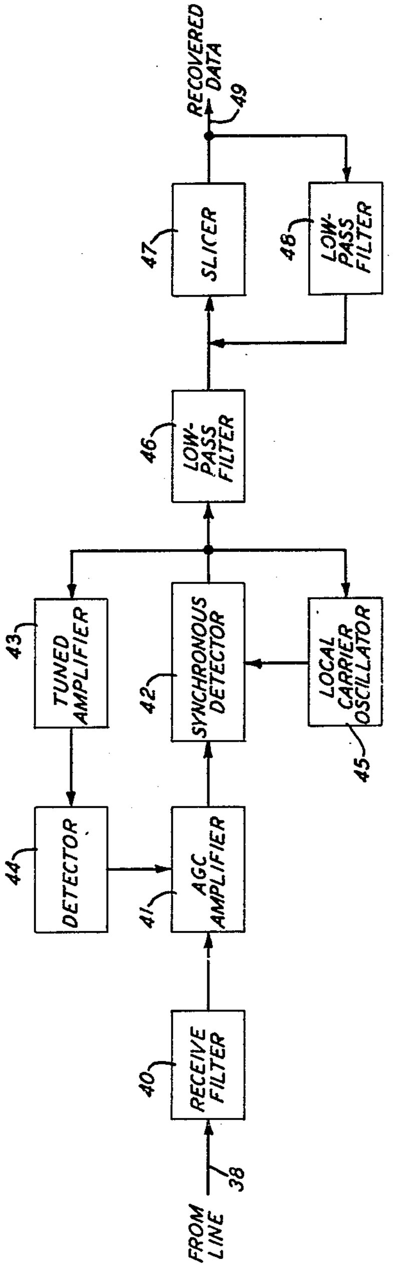
FIG. 4 is a block diagram of the simpler receiver circuit adequate to demodulate the type of vestigial sideband signal generated by the transmitter of FIG. 3.

FIG. 4 illustrates the simplified receiver circuit made possible by the particular type of vestigial sideband signal resulting from the transmitter of FIG. 3. The incoming signal on line 38 is first passed through a receiver bandpass filter 40 for the purpose of removing frequencies outside the voice range which result from noise in the transmission line or in the telephone switching office. The incoming signal is further limited in automatic gain control amplifier 41 to standardize the signal applied to the detector. A local carrier oscillator 45 is provided to furnish a phase-locked carrier output to an input of synchronous detector 42. The other input of detector 42 receives the constant level line signal from amplifier 41. Detector 42 is of the same type as that used in FIG. 2. Now, however, since there is no in-phase carrier component in the transmitted signal there is no direct-current component in the output to be compensated in the data recovery circuit. The quadrature carrier component is directly available to cause lock-in of local oscillator 45. A second harmonic of the carrier frequency is available as an automatic gain control voltage. This harmonic is easily recovered in tuned amplifier 43 which is tuned to twice the carrier frequency. The output of amplifier 43 is rectified and the envelope detected in detector 44. The resultant direct-current signal is available to adjust the gain of amplifier 41 in a well known manner.

The data intelligence signal also appears in the output of detector 42 as a two level direct current. Thus, the output of the detector is passed also through low-pass filter 46 to remove carrier components. The data signal is applied to a slicer circuit 47 which has a positive output for input signals above some threshold level and a negative output for signals below the threshold to form square bipolar pulses. The slicer may have a threshold level established by means of a precision voltage divider. The slicing level, for example, may be set at zero volts. To reestablish the low frequency components removed at the transmitter by high-pass filter 31 a feedback path is established from the output of slicer 47 to its input. Filter 48 has a characteristic complementary to that of high-pass filter 31. It may be a resistance-capacitance integrator circuit having a time constant comparable in magnitude to a data bit interval. The recovered data on line 49 is then of the same bipolar type as that produced in data source 30 in FIG. 3.

While this invention has been described above with reference to a particular data transmission system, it will be realized by those skilled in the art that numerous modifications are possible within the scope of the following claims.

What is claimed is:

1. A vestigial sideband transmission circuit comprising a message signal source, means for suppressing low frequency components in said message signal, a carrier wave source, means for product modulating said carrier wave and the output of said suppressing means to form a double-sideband, amplitude-modulated suppressed-carrier signal wave, means for inserting an unmodulated quadrature component of said carrier wave into the output of said modulating means in the frequency space left from the operation of said suppressing means on said message signal, and means for removing all but a vestige of one of the sidebands in the output of said modulating means.

2. The vestigial sideband transmission circuit according to claim 1 in which said suppressing means comprises a high-pass filter.

3. The vestigial sideband transmission system according to claim 1 in which said inserting means includes a quadrature phase shift circuit in series with an output of said carrier wave source and a hybrid circuit means coupling the output of said modulating means to the input of said removing means.

4. A voice band data transmitter comprising a data source, means for suppressing all frequencies in the output of said data source below a predetermined threshold, a carrier wave source, means for modulating the output of said suppressing means with the output of said carrier source, means for phase-shifting the output of said carrier source by 90 electrical degrees, means for combining the outputs of said modulator and said phase-shifting means to form a double-sideband quadrature carrier wave, and a bandpass filter for substantially removing one sideband in the output of said combining means to form a vestigial sideband line signal.

5. A system for transmitting bipolar binary data from a data transmitter to a data receiver through a communication channel to provide an output signal from said receiver corresponding to the transmitted data, said system comprising means for removing low frequency components from said bipolar data to provide a guard frequency space between sidebands of the transmitted signal, means for modulating said bipolar data stripped of low frequency components upon a carrier wave to form a suppressed carrier signal, means for inserting a reduced level quadrature frequency into the guard space between sidebands of the transmitted signal, means for suppressing one of said sidebands to make said transmitted signal vestigial in nature, means for synchronously detecting the transmitted data signal, a carrier wave oscillator driving said detecting means, the quadrature carrier component of said transmitted signal causing lock-in of said oscillator with the carrier wave generated at said transmitter, a slicing circuit having a switching threshold for regenerating said bipolar data from the output of said detecting means, and feedback means around said slicing circuit for restoring the low frequency components to said bipolar data removed by said removing means.

6. A system for transmitting binary data from a data transmitter to a data receiver through a communication channel to provide an output signal from said receiver corresponding to the data transmitted, said system comprising a bipolar data signal source, filter means for attenuating frequency components below a certain frequency level in the output of said signal source, a carrier wave source, means for modulating attenuated data signals in the output of said filter means upon said carrier wave while suppressing said carrier wave, means for reinserting said carrier wave into the output of said modulating means in phase quadrature with said suppressed carrier in the frequency space between sidebands formed in the output of said modulating means, means for removing one of said sidebands, means for impressing the output of said removing means on said communication channel as a vestigial sideband transmitted wave, synchronous detection means for recovering the transmitted data from said communication channel, a local oscillator generating the frequency of said carrier and furnishing an input to said detection means, the frequency and phase of said oscillator output being locked to the quadrature carrier component of said transmitted wave, slicing circuit means for recovering bipolar data from the output of said detection means for producing an output of one polarity for input signals above a certain threshold level and of the opposite polarity for signals below said threshold level, and means for restoring frequency components to the output of said detector means attenuated by said filter means comprising a feedback loop around said slicing means having an amplitude-frequency characteristic complementary to that of said filter means.

7. A receiver for bipolar binary data modulated as phase reversals of a carrier wave in a vestigial sideband transmitted signal in which a carrier wave component appears in quadrature to the normal position thereof comprising an automatic gain controlled amplifier accepting said transmitted signal, a synchronous detection circuit, a source of carrier wave oscillations, means for supplying the output of said source to said detection circuit, means for impressing part of the output of said detector on said source so that the frequency and phase of said oscillations are locked to the quadrature carrier component of said transmitted wave, means for detecting in the output of said detector a second harmonic of said transmitted carrier to generate a control signal for said amplifier, and means for recovering said bipolar data from the output of said detector.

8. In a receiver for a vestigial sideband signal having a carrier wave component in quadrature with the carrier wave on which binary data is encoded as opposite phases of said carrier wave a gain controlled amplifier on which the received signal is impressed, a stable local oscillator nominally operating at the frequency of said carrier wave, a homodyne detector in tandem with said amplifier for product modulating the output of said amplifier with the oscillation from said local oscillator and producing in its output a quadrature carrier wave component, a second harmonic of said carrier wave and a two-level signal representative of said transmitted data, means for impressing said quadrature component on said local oscillator to cause lock-in in frequency and phase with the transmitted carrier wave, means for rectifying the second harmonic of said carrier wave component as a control signal for said amplifier, and a two-level signial discriminating circuit for reconstructing the data signal in the output of said detector.

References Cited in the file of this patent

UNITED STATES PATENTS

| | | |
|---|---|---|
| 2,604,533 | Koros | July 22, 1952 |
| 3,007,005 | Moore et al. | Oct. 31, 1961 |